Feb. 28, 1939.  J. D. MARKWOOD  2,148,486
GLASS SCRUBBER AND STERILIZER
Filed Nov. 30, 1936   4 Sheets-Sheet 3

INVENTOR.
JACOB D. MARKWOOD
BY
ATTORNEY.

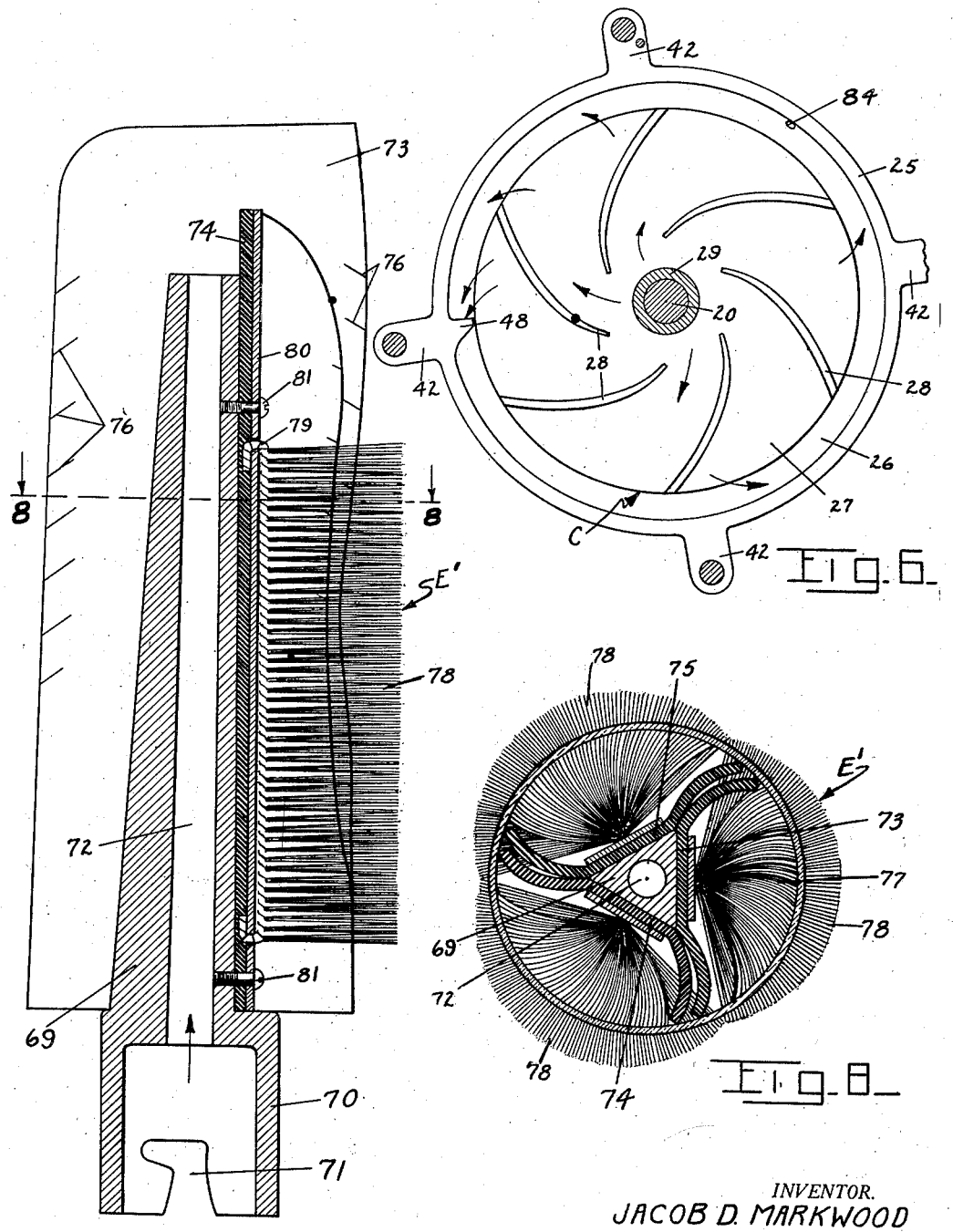

Patented Feb. 28, 1939

2,148,486

UNITED STATES PATENT OFFICE 2,148,486

GLASS SCRUBBER AND STERILIZER

Jacob D. Markwood, Minneapolis, Minn.

Application November 30, 1936, Serial No. 113,411

7 Claims. (Cl. 15—76)

This invention relates to apparatus for cleaning and sterilizing drinking glasses, tumblers, steins, cups, and similar vessels, and the primary object is to provide a novel, efficient, and practical machine which will not only wash the glass but will completely remove all film or foreign substance from both inner and outer surfaces and thereby leave the glass in a completely scrubbed and sterilized condition in readiness for further use.

A further object is to arrange the glass cleaning equipment within a water heating and storage chamber and to provide mechanism for circulating and recirculating only the cleaner portion of the water to the glass scrubbing brushes. A further object is to provide the water circulating apparatus with a strainer for continuously cleaning the water as it is recirculated to the cleaning and scrubbing elements. A further object is to provide a machine of this character with cleaning or scrubbing devices for simultaneously operating on both inner and outer surfaces of the glass, and means for continuously flushing all of said devices while in operation, thus insuring the continuous removal of foreign matter from both the cleaners and the glass surfaces. A further object is to provide a novel and effective construction of scrubbing unit for cleaning the inside of the glass. These and still other and more specific objects will be disclosed in the course of the following specification, reference being had to the accompanying drawings, wherein:

Fig. 6 is a plan view of the water pump casing and impeller, as on line 6—6 in Fig. 2.

Fig. 7 is an enlarged, detail, sectional elevation of the detachable unit which is employed to brush, scrub, and flush the inner surface of the glass to be cleaned.

Fig. 8 is a cross sectional view through the upper part of the unit as shown on the line 8—8 in Fig. 7, and with a drinking glass or tumbler in place thereon.

Figure 1:
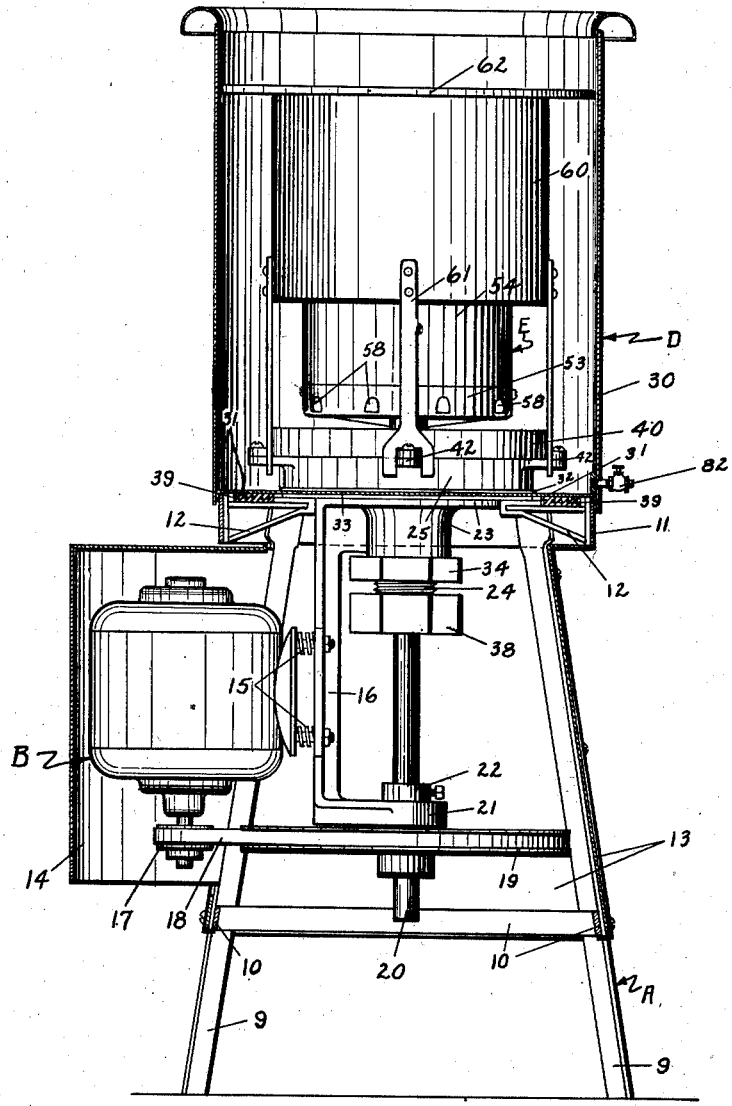
Fig. 1 is an elevation of the entire machine, with the major portion thereof shown in diametrical section.

Referring to the drawings more particularly and by reference characters, A designates generally a supporting frame structure including upwardly converging legs 9 connected by suitable cross bars 10, and at their upper ends rigidly supporting an annular ring 11, which in turn is provided with inwardly projecting radial brackets 12 which support the operating mechanism. The legs 9 are further preferably connected by enclosing plates 13, and at one side of the frame structure a shell or housing 14 is arranged to enclose and protect the operating motor B.

The motor B is vertically disposed, and is adjustably and flexibly mounted as at 15 to a bracket 16 extending downwardly within the supporting frame structure. The motor shaft is provided at its lower end with a pulley 17 which operates through a belt 18 to drive a pulley 19 on a vertically arranged spindle shaft 20. The lower end of the shaft 20 is journaled in a suitable bearing extension 21 of the bracket 16, and a collar 22 may be employed to support the shaft in its proper vertical position.

The upper end of the bracket casting 16 is formed with a bearing hub 23 down through which axially extends a sleeve 24 which is formed integrally with a pump casing 25, which casing has a shallow chamber 26 within which operates a centrifugal pump designated generally by the letter C. This pump includes a circular plate 27 having a series of circumferentially spaced impeller vanes 28. The plate 27 has a hub 29 through which the shaft 20 extends, and is rigidly secured whereby rotation of the shaft will operate the pump.

Figure 2:
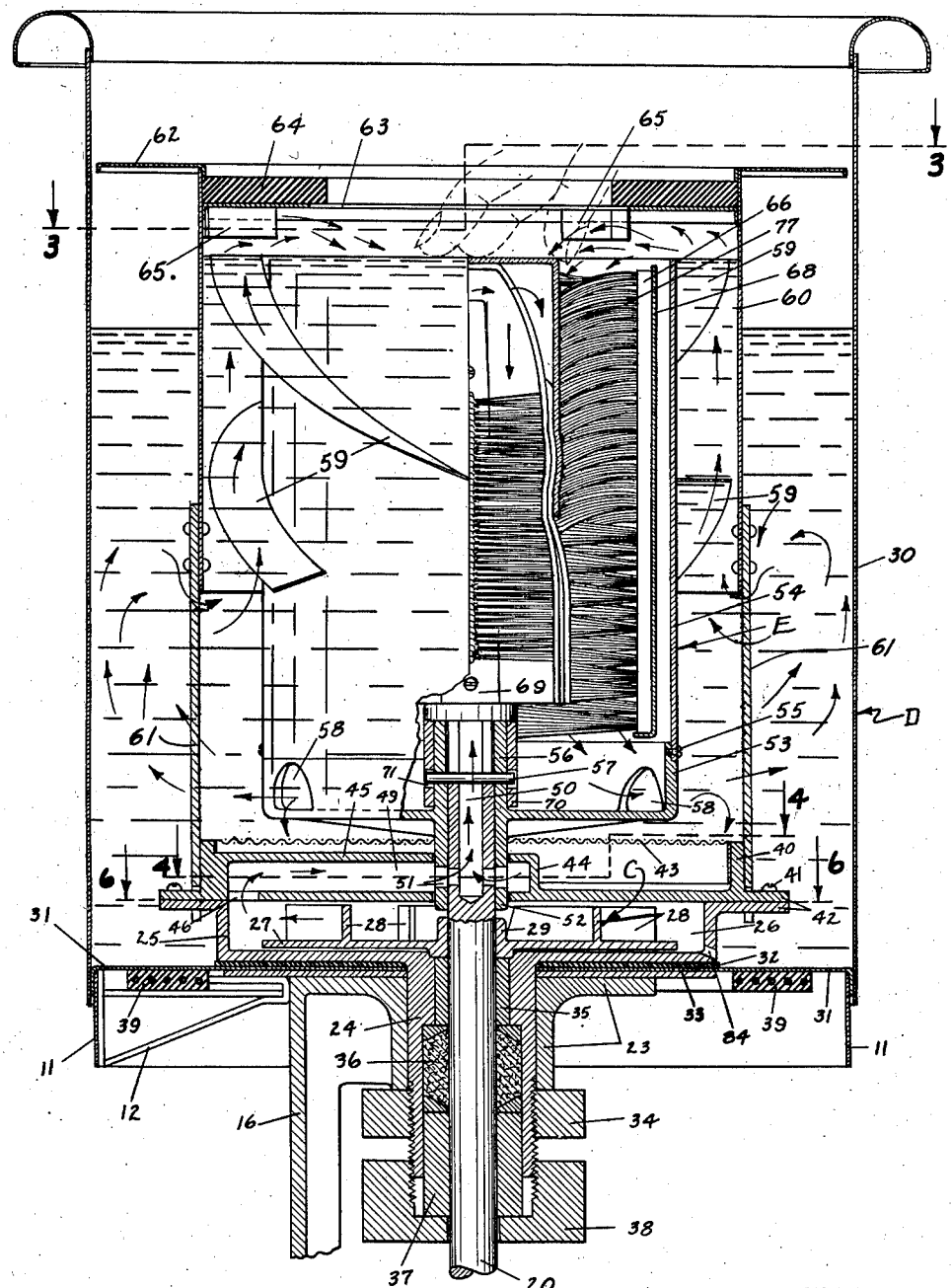
Fig. 2 is a sectional elevation of the upper part of the machine, as shown in Fig. 1, but on an enlarged scale, with various portions in full.

An outer tank or container D encloses the operating mechanism, and in the present instance includes an outer cylindrical wall 30 and a bottom forming plate 31, which plate extends inwardly between the casting hub 23 and the pump casing 25, as shown particularly in Fig. 2. Between the plate 31 and the casing 25 there is also arranged a gasket 32, and between the wall 31 and the hub 23 is arranged a large washer or disk 33. It will now be noted that the lower portion of the sleeve 24 is externally threaded and projects downwardly beyond the hub 23 to receive a clamping nut 34. By drawing this nut 34 up tightly against the hub 23 it will pull the sleeve 24 down into the hub, and will thereby securely clamp the members 31, 32, and 33 tightly and rigidly between the casting members 23 and 25. This will in turn not only insure a rigid construction, but will prevent any leakage of liquid from the container D.

Referring again to sleeve 24, it will be seen that it is provided within its upper end portion with a bushing 35 to constitute proper bearing support for the shaft 20 within the sleeve. To prevent leakage of water downwardly about the shaft and also to provide means for lubricating the same, I arrange a stuffing box 36 about the shaft and immediately below the bushing 35, and the packing material in this box may of course be impregnated with a suitable lubricating medium. Extending upwardly under the packing box 36 is a collar 37 which is slidable in the lower end of the sleeve 24 and projects therefrom for endwise engagement by a nut 38 which is also threaded to externally engage the sleeve 24. As the nut 38 is gradually tightened or screwed upwardly on the sleeve 36 it will of course cause the collar 37 to move upwardly and compress the packing within the packing box, as conditions may from time to time necessitate.

It may here be noted that a heating ring 39 is arranged immediately under the container plate 31, and between the outer edge thereof and the washer 33, and this heating unit has for its purpose to heat the water in the container D to the desired temperature. Suitable current supply and switch connections for this heating member, while not shown, may obviously be of any desirable construction or arrangement.

Over the pump casing 25 is arranged a strainer casing 40, and the two casings are rigidly secured together by screws 41 which pass through lugs 42 which extend outwardly from the respective casings and in peripherally spaced arrangement. The casing 40 has an upstanding, annular flange which supports a circular strainer screen 43. The casing 40 is designed in such a way as to include a central, hollow hub section 44 which communicates through a hollow arm 45 to an opening 46 in the bottom of the casing and which communicates with the chamber 26 of the pump casing 25 at an outward point. The plate portion of the strainer casing 40 is further provided about the hub portion 44 with a pair of arcuate slots 47 (see Fig. 4) down through which fluid may pass from the strainer casing 40 and into the chamber 26 at points of delivery adjacent to the inner ends of the centrifugal impeller vanes 28.

Figure 5:
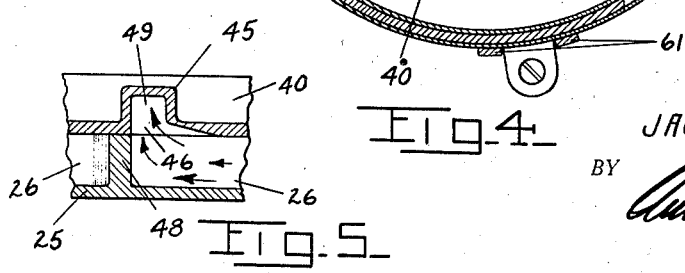
Fig. 5 is a detail, sectional elevation on the line 5—5 in Fig. 4.

It will further be noted with particular reference to Figs. 5 and 6 that the chamber 26 is provided with a lug 48 which is arranged in such a position with respect to the aperture 46 so as to act as a stop or deflector for the fluid which is impelled outwardly and circularly by the pump 27, and direct such fluid upwardly into the passageway 49 in the casting members 45 and 44.

Figure 4:
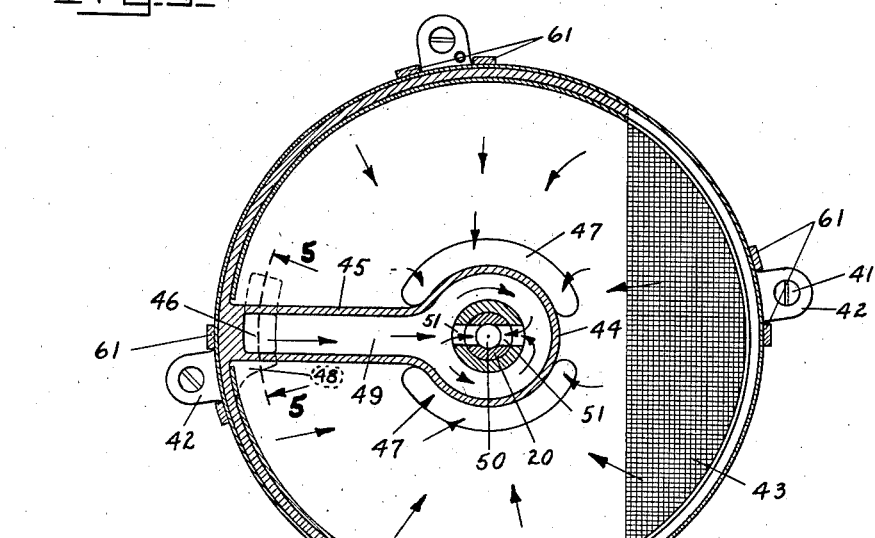
Fig. 4 is a sectional, plan view on the irregular line 4—4 in Fig. 2.

Attention is now directed to the spindle construction as shown in Figs. 2 and 4, wherein it will be noted that the upper end of the shaft 20 is axially chambered as at 50, and that this chamber communicates with the passageway 49 through registering openings 51 which extend radially through the shaft 20 and through a collar 52 which extends integrally down from a casting 53 forming the lower end of a rotatable cup or cylinder designated as E, and having a cylindrical wall 54 secured upon the base casting 53 as by screws 55. The casting 53 has an upwardly extending sleeve 56 which is in fact a continuation of the downwardly projecting sleeve 52, and this upper sleeve is non-rotatably secured to the shaft 20 by a pin 57 which is removably inserted in vertical end slots of the shaft. The vertical flange portion of the cylinder casting 53 is provided with annularly spaced openings 58 through which water may be discharged into the lower end of the container D. The upper portion of the cylinder E is provided about its exterior surface with a series of spirally formed vanes 59 serving as water lifters, and which function when the cylinder E is rotated to lift or raise water or cleansing fluid from the body thereof within the container D to supply the external brushes and to flush the outer surface of the glass under treatment. These lifters 59 operate within a cylindrical separator sleeve 60 which extends down about the cylinder E, and may be supported in any suitable manner, as for instance by a series of legs 61, the lower ends of which releasably engage over the lugs 42.

The upper end of the sleeve 60 is provided with an external flange 62 extending substantially to the outer container wall 30, and the sleeve is also provided at a slightly lower level with an internal flange 63 which supports a ring 64, said ring having a center opening somewhat smaller than that of the flange 63. The ring 64 is made of soft rubber or other resilient material so that glasses and tumblers coming in contact with it will not become chipped or broken.

Figure 3:
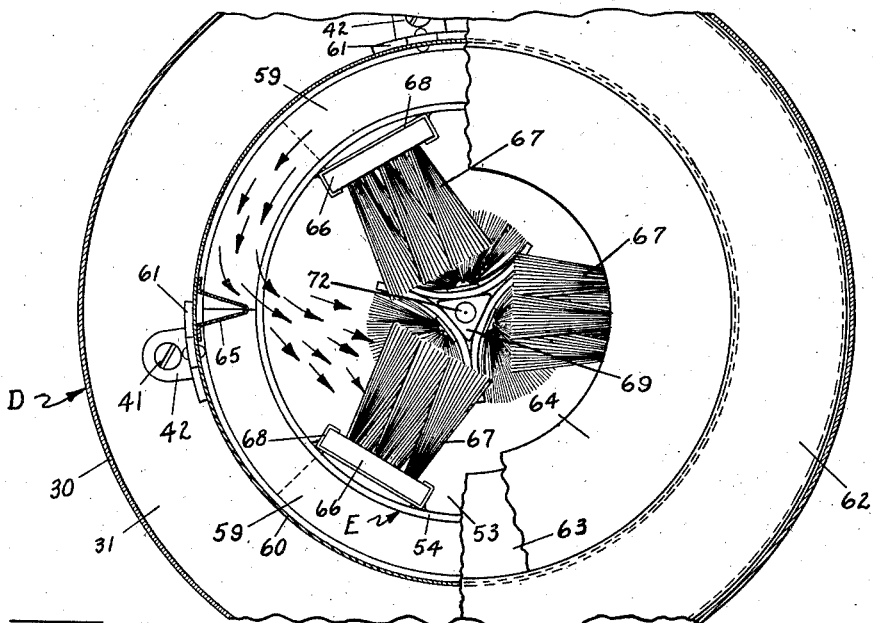
Fig. 3 is a partly sectional, plan view on the irregular line 3—3 in Fig. 2.

Rigidly secured under the flange 63, and adjacent the sleeve 60, is a series of wedge shaped baffles or deflectors 65, spaced and arranged in such a manner as to deflect inwardly the cleansing fluid which is moving upwardly and circularly under the action of the lifter vanes 59, all as indicated by the direction arrows in Figs. 2 and 3.

The apparatus for scrubbing the outer surface of the glasses to be cleaned consists of three brushes, each including a brush block 66 and a conventional arrangement of bristle tufts 67 secured in such blocks. The blocks are removably secured by being vertically slidable in channel shaped holders 68 that are spot welded or otherwise secured to the inner surface of the cylinder wall 54. These brushes may be easily removed vertically when the machine is idle, and when the sleeve unit 60 has first been lifted up from its operative position within the container D, thus facilitating brush repair or replacement as the occasion may require.

The device which I have designed for scrubbing, brushing, and flushing the inner surfaces of the glasses to be cleaned, is shown in Figs. 2, 3, 7, and 8, and comprises a vertical nozzle member 69 having an enlarged socket portion 70 at its lower end, and which socket portion fits over the sleeve 56 of the casting 63. It will also be noted that the socket is provided with bayonet slots 71 for engaging the outer ends of the pin 57 to thereby releasably secure the inner cleaning unit to the spindle and cylinder structure. The nozzle 69 has a central passageway 72 in direct axial alignment with the shaft bore 50; and as the cleansing fluid is impelled upwardly through the opening 72 under the action of the pump C it bubbles over in just sufficient quantity to properly feed the scrubbing and brushing elements and thoroughly flush the inner surface of the glass being cleaned.

It will be noted with particular reference to Figs. 3, 7, and 8 that the nozzle member 69 is triangular in cross section, and upon the three vertical surfaces thus formed are secured three scrubbing elements 73, 74, and 75, each of which has lateral edge portions which are free to adjust themselves to the contour of the inner surface of the glass; and to assist in this flexibility the edges of the several scrubbing plates are slit at spaced intervals, as indicated at 76 in Fig. 7, whereby the edge portions of the material may further flex or yield in response to irregularities or grooves in the glass structure.

As an important feature in connection with the scrubbing structure just referred to it will be noted, as clearly shown in Fig. 8, that while adjacent edge portions of the several scrubbing plates are close together, they will, when in operation, have independent or separate contact with the glass surface, and in fact the three members will present six different and distinct scrubbing edges for contact with the glass surface.

It will also be noted with particular reference to Fig. 7, that one of the scrubbing elements 73 extends upwardly beyond the limits of the other two elements, and this extension is sufficiently flexible so that it may be easily gathered in or constricted when a very tapered design of drinking glass is inserted in place for cleaning.

The inner glass cleaning unit which I have generally designated by the letter E' consists further of a series of brush members 77, one of which extends lengthwise of each scrubbing element, and in the present instance comprises a semi-cylindrical formation of brush bristles 78 carried by a twisted wire 79, the ends of which are anchored to the nozzle 69 by plates 80 that are secured to the nozzle by screws 81, and which also function to secure the respective scrubbing plates 73, 74, and 75 in operative positions.

The use and operation of the machine, while possibly obvious from the foregoing description, may be described as follows: The machine is first filled with water to substantially the level indicated outwardly of the sleeve 60 in Fig. 2. It may here be noted, however, that unlike certain other machines now in use, the exact level of the fluid is not of vital importance, as it will function to circulate and recirculate the water even though the normal fluid level may be varied considerably. It is of course understood that cleansing solutions or compounds may be added to the water when so desired, and may result in quicker if not better cleaning of the glasses. In any event, with the cleaning solution or water in readiness the motor B is energized and operates through the pulleys 17 and 19 and belt 18 to rotate the spindle shaft 20 in the bearings of bracket 16. The shaft movement will also rotate the centrifugal pump C and the cup-like cylinder E, and thereby also rotates the inner and outer glass cleaning elements.

As the cylinder E rotates the vanes 59 operate with a rotary and lifting action to upwardly displace the water in the annular space between walls 54 and 60, and as this fluid is forced upwardly against the flange 63 it moves with a rotary motion which also brings it into contact with the several baffles or deflectors 65. This action results in diverting the fluid inwardly and downwardly, as shown by the arrows in Figs. 2 and 3.

When a glass is now held down in position, as shown in Figs. 2 and 8, the water thus deflected inwardly and downwardly will amply supply the brushes 67 so that they will properly operate against the exterior surface of the glass, and this water will also function to thoroughly flush the glass surface and by circulating down, through, and between the brushes, will keep the brushes clean and in sanitary condition.

As the shaft 20 rotates it also operates to circulate fluid into and through the scrubbing and brushing elements operating within the glass, and this occurs as follows: The fluid within the strainer casing 40 is free to pass downwardly through the arcuate slots 47 in the strainer plate 40, and into the chamber 26 where the centrifugal pump C operates to impel the water outwardly and in a circular direction within the pump chamber. As the fluid is ultimately brought into contact with the lug 48 it is forced upwardly into the passageway 49 and through the openings 51 into the shaft bore 50 and nozzle 72, from whence it is discharged and escapes downwardly within the glass to rejoin the fluid which is simultaneously being discharged from the outer brush elements. As the fluid thus utilized reaches the base 53 of the cylinder E it is discharged through the openings 58 under the combined action of its own weight and centrifugal force. The fluid then passes out into the lower portion of the outer container D, and as the pump C continues to operate a part of the fluid will pass down through the screen 43 to replace that which has been withdrawn under the action of the pump. A considerable portion of the fluid, however, passes upwardly along the inner surface of the container D, as indicated by the arrows in Fig. 2, and into the annular space or trap between the cylindrical walls 60 and 30. The purpose of this arrangement is to provide means for ejecting from the water greases or other oily substances which have been removed from the glasses, and to prevent such substances from being recirculated to the cleaning brushes. With the arrangement as shown the foreign matter referred to will float up into the annular space outwardly of the sleeve 60 and remain there until the entire machine is emptied of its contents and cleaned. As the sleeve 60 projects a substantial distance below the surface of the fluid in the outer chamber, it is obvious that the lifters 59 can only engage cleaning fluid that has been at least to a substantial extent cleaned of undesirable foreign substances. In other words, the outer annular space referred to serves as a trap or separation chamber, and only the relatively cleaner and purer portion of the fluid will pass either downwardly to the pump C for cleaning the inside of the glass, or upwardly by the lifters 59 to clean the exterior surface of the glass.

It may here be noted that the container D is provided with a drain pipe 82 (see Fig. 1) to facilitate draining and cleaning the machine, and in order that no fluid may be trapped in the pump casing 25 it is desirable to provide it with a small drain hole 84, which hole, however, is not of such size as to interfere with the normal operation of the machine.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a glass washer, a receptacle for containing cleansing liquid, a pump casing disposed in the lower end of the receptacle and having a centrifugal pump member rotatable therein, a strainer unit mounted over the pump casing and for straining the liquid passing into the pump casing, a device mounted over and in axial alignment with the centrifugal pump member and driven thereby for scrubbing engagement internally of the glass to be cleaned and having an axial liquid passageway, said strainer unit having means for conducting liquid from the discharge side of the centrifugal pump to said scrubbing device passageway.

2. In a glass cleaning machine, a receptacle for containing the cleansing liquid, a rotatable glass cleaning device disposed in the receptacle and including inner and outer brush elements for contact, respectively, with inner and outer surfaces of the glass to be cleaned, a cylindrical member encircling the glass cleaning device and rotatable coaxially therewith, a tubular sleeve surrounding the cylindrical member and spaced between said member and the receptacle to form an annular separating chamber in the receptacle outwardly of the sleeve, said sleeve extending above and below the level of the liquid in the receptacle, and means, operative in conjunction with rotation of the cleaning device and cylindrical member, for circulating liquid in the receptacle upwardly between the cylindrical member and said sleeve, whereby such liquid may pass inwardly over the upper end of the cylinder and thence downwardly through the outer brush elements and into the lower portion of the receptacle for recirculation purposes.

3. In a glass cleaning machine, a receptacle for containing the cleansing liquid, a rotatable glass cleaning device disposed in the receptacle and including inner and outer brush elements for contact, respectively, with inner and outer surfaces of the glass to be cleaned, a cylindrical member encircling the glass cleaning device and rotatable coaxially therewith, a tubular sleeve surrounding the cylindrical member and spaced between said member and the receptacle to form an annular separating chamber in the receptacle outwardly of the sleeve, said sleeve extending above and below the level of the liquid in the receptacle, and means, operative in conjunction with rotation of the cleaning device and cylindrical member, for circulating liquid in the receptacle upwardly between the cylindrical member and said sleeve whereby such liquid may pass inwardly over the upper end of the cylinder and thence downwardly through the outer brush elements and into the lower portion of the receptacle for recirculation purposes, said circulating means comprising spiral vanes attached to the cylinder and exerting a lifting action on the water disposed in the annular chamber between the cylinder and sleeve.

4. In a glass cleaning machine, a receptacle for containing the cleansing liquid, a rotatable cup mounted in the receptacle with its open upper end above the level of the liquid in the receptacle the said cup having openings in its lower portion, glass cleaning devices in the cup and having an upwardly extended liquid passageway, a separating sleeve mounted around the upper portion of the cup and spaced between the cup and receptacle and extending above and below the liquid level, thereby forming a separating chamber outside of the sleeve, and means for circulating the cleansing liquid upwardly through the passageway in the cleaning devices, upwardly between the cup and sleeve, and then downwardly through the cup.

5. In a glass cleaning machine, a receptacle for containing the cleansing liquid, a rotatable cup mounted in the receptacle with its open upper end above the level of the liquid in the receptacle, glass cleaning devices in the cup, a separating sleeve mounted around the cup and spaced between the cup and receptacle and extending above and below the liquid level, thereby forming a separating chamber outside of the sleeve, and means for circulating the cleaning liquid upwardly between the cup and sleeve and downwardly through the cup, the said cup having openings to discharge the circulated liquid out beneath the sleeve for recirculation back through the space between the cup and the sleeve.

6. In a glass cleaning machine, a receptacle for the cleansing liquid, a cup rotatably and centrally mounted in the receptacle and extending at its open upper end above the level of the liquid in the receptacle, glass cleaning devices in the cup, a sleeve supported concentrically in the receptacle and spaced between the cup and the receptacle, the said sleeve extending at its upper end above the cup but terminating at its lower end above the level of the lower end of the cup, the cup having outlets in its lower portion, and means on the cup for circulating and recirculating the liquid upwardly inside the sleeve and downwardly through the cup.

7. In a glass cleaning machine, a receptacle for the cleansing liquid, a cup rotatably and centrally mounted in the receptacle and extending at its open upper end above the level of the liquid in the receptacle, glass cleaning devices in the cup, a sleeve supported concentrically in the receptacle and spaced between the cup and the receptacle, the said sleeve extending at its upper end above the cup but terminating at its lower end above the level of the lower end of the cup, the cup having outlets in its lower portion, and means on the cup for circulating and recirculating the liquid upwardly inside the sleeve and downwardly through the cup, and a liquid pump located at the lower portion of the receptacle and having discharge means extended up centrally into the cup.

JACOB D. MARKWOOD.